United States Patent
Altmyer et al.

(10) Patent No.: US 9,919,799 B2
(45) Date of Patent: Mar. 20, 2018

(54) AIRCRAFT INTERIOR MODULE SUPPORT SYSTEM INCLUDING SHARED FITTINGS

(71) Applicant: The Boeing Company, Chicago, IL (US)

(72) Inventors: Brett N. Altmyer, Everett, WA (US); Jeffrey A. Cartwright, Arlington, WA (US); Mark J. Nadvornick, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 14/547,314

(22) Filed: Nov. 19, 2014

(65) Prior Publication Data
US 2016/0137300 A1    May 19, 2016

(51) Int. Cl.
    *B64D 11/00*    (2006.01)
(52) U.S. Cl.
    CPC .............. *B64D 11/003* (2013.01); *Y02T 50/46* (2013.01)
(58) Field of Classification Search
    CPC ....... B64C 1/061; B64C 1/18; B64D 11/0023; B64D 11/003; F16B 19/02; F16B 21/12
    See application file for complete search history.

(56) References Cited

U.S. PATENT DOCUMENTS

| | | |
|---|---|---|
| 3,797,789 A | 3/1974 | Wasson |
| 4,648,570 A | 3/1987 | Abdelmaseh et al. |
| 5,083,727 A | 1/1992 | Pompei et al. |
| 5,839,694 A | 11/1998 | Bargull et al. |
| 5,938,149 A | 8/1999 | Terwesten |
| 6,045,204 A | 4/2000 | Frazier et al. |
| 6,536,710 B1 | 3/2003 | Bobzien et al. |
| 6,883,753 B1 | 4/2005 | Scown |
| 7,258,406 B2 | 8/2007 | Stephan et al. |
| 7,270,297 B2 | 9/2007 | Schaefer et al. |
| 7,497,638 B2 | 3/2009 | Tubbs et al. |
| 8,382,038 B2 | 2/2013 | Benthien |
| 2010/0288879 A1 | 11/2010 | Bock et al. |
| 2013/0056242 A1* | 3/2013 | Phillips, Jr. ............. F16B 7/182 174/152 R |

* cited by examiner

*Primary Examiner* — Valentina Xavier
(74) *Attorney, Agent, or Firm* — Miller, Matthias & Hull LLP

(57) ABSTRACT

An aircraft fuselage comprises a support structure, a first interior module having a first support arm, a second interior module having a second support arm, and a support system for suspending the first and second interior modules from the support structure. The support system includes a shared fitting for releasably attaching to the first and second support arms of the first and second interior modules. The shared fitting is configured to react a first rotational force when the first support arm is attached and the second support arm is released. The shared fitting is configured to react a second rotational force when the second support arm is attached and the first support arm is released.

15 Claims, 4 Drawing Sheets

AIRCRAFT INTERIOR MODULE SUPPORT SYSTEM INCLUDING SHARED FITTINGS

BACKGROUND

In an aircraft fuselage, overhead bins may be arranged end-to-end and suspended from frames, beams, and other support structures. A system for suspending the overhead bins typically includes fittings attached to ends of the overhead bins, and tie rods and struts attached between the fittings and the support structures. Each overhead bin may have a fitting at each end. However, it is preferred for adjacent ends of overhead bins to share a single fitting. Shared fittings are used for weight reduction, fewer structural interfaces to protect against moisture, and fewer interfaces to manage.

The overhead bins are relatively large, heavy and long. If one overhead bin is removed, adjacent bins must be supported. Supporting the adjacent bins involves redundant tools, redundant alignment requirements, extra labor, and extra time.

SUMMARY

According to an embodiment herein, an aircraft fuselage comprises a support structure, a first interior module having a first support arm, a second interior module having a second support arm, and a support system for suspending the first and second interior modules from the support structure. The support system includes a shared fitting for releasably attaching to the first and second support arms of the first and second interior modules. The shared fitting is configured to react a first rotational force when the first support arm is attached and the second support arm is released. The shared fitting is configured to react a second rotational force when the second support arm is attached and the first support arm is released.

According to another embodiment herein, a support system suspends first and second interior modules from a support structure in an aircraft fuselage. The first and second interior modules have first and second support arms, respectively. The support system comprises a shared fitting. The shared fitting includes a frame having a central portion configured to be coupled to the support structure, and first and second clevises at opposite ends of the central portion. The first support arm extends into a first gap formed by the first clevis, and the second arm extends into a second gap formed by the second clevis. The shared fitting further includes a first pair of releasable pins for pinning the first support arm to the first clevis, and a second pair of releasable pins for pinning the second support arm to the second clevis.

According to another embodiment herein, a shared fitting connects adjacent first and second support arms of first and second interior modules, respectively, to an aircraft support structure. The shared fitting comprises a central portion configured to be secured to the support structure, a first plate at a first end of the central portion, a second plate spaced apart from the first plate to form a first gap that is dimensioned to receive the first support arm, a first pair of releasable pins for pinning the first support arm to the first and second plates, a third plate at a second end of the central portion, a fourth plate spaced apart from the third plate to form a second gap that is dimensioned to receive the second support arm, and a second pair of releasable pins for pinning the second support arm to the third and fourth plates.

These features and functions may be achieved independently in various embodiments or may be combined in other embodiments. Further details of the embodiments can be seen with reference to the following description and drawings.

DETAILED DESCRIPTION

Figure 1:
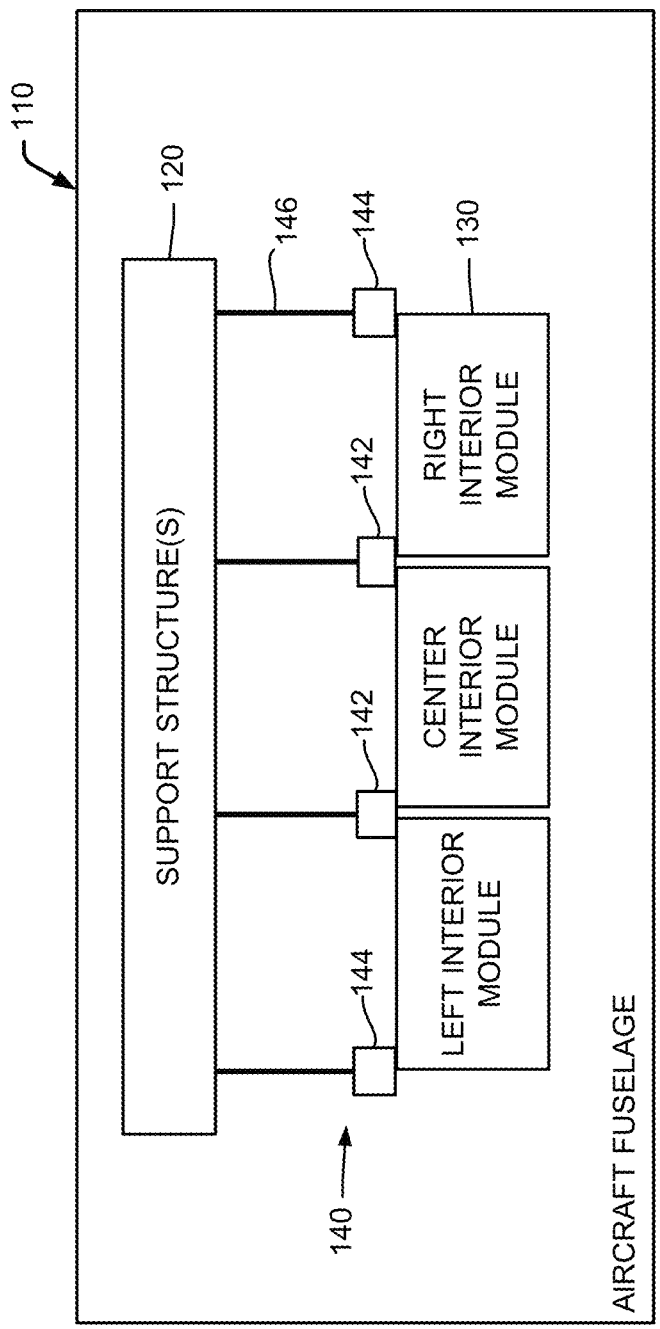
FIG. 1 is an illustration of an aircraft fuselage including a plurality of interior modules and a support system for supporting the interior modules.

FIG. 1 illustrates an aircraft fuselage 110 including a plurality of support structures 120. The support structures 120 include primary support structures and secondary support structures. Examples of the primary support structures include, but are not limited to, airframe members (e.g., frames and stringers), and floor beams. Examples of the secondary support structures include, but are not limited to, rails and ladders.

The fuselage 110 further includes a plurality of interior modules 130. The interior modules 130 include, but are not limited to, overhead bins, ladders, and monuments.

The fuselage 110 further includes a support system 140 for supporting the interior modules 130 from the support structure 120. The support system 140 may include fittings 142 and 144 that are attached to the modules 130. The support system 140 may also include connecting members 146 that connect the fittings 142, 144 to the support structures 120. Examples of the connecting members 146 include tie rods, and struts. In some configurations, the connecting members 146 may be eliminated and the fittings 142 and 144 may be attached directly to the support structure 120

Some interior modules 130 may be suspended from rails that, in turn, are suspended from airframe members. Other interior modules 130 may be suspended directly from floor beams. Still other interior modules 130 may be suspended from secondary support structures, which are suspended from other secondary support structures.

FIG. 1 illustrates left, center and right interior modules 130 that are arrange end-to-end. Each interior module 130 has support arms (not shown) near opposite ends. Two shared fittings 142 are attached to adjacent modules 130. Thus, a first shared fitting 142 is attached to second and first support arms of the left and center interior modules 130, and a second shared fitting 142 is attached to second and first support arms of the center and right interior modules 130. A first support arm of the left interior module 130 may be attached to an end fitting 144 having a conventional design. Similarly, a second support arm of the right interior module 130 may be attached to an end fitting 144 having a conventional design.

The three interior modules 130 of FIG. 1 are illustrative. The aircraft fuselage 110 may have a wide variety of interior modules 130 that are grouped in different numbers and different configurations. Some of the interior modules 130 may be overhead bins arranged end-to-end. Some of the interior modules 130 may be monuments. Some of the interior modules 130 may even be structures such as ladders, with bins or monuments attached to ladders. For a monument such as a galley or lavatory or closet, the tipping load is transmitted through the ladder and then through the support structure 120.

Figure 2:
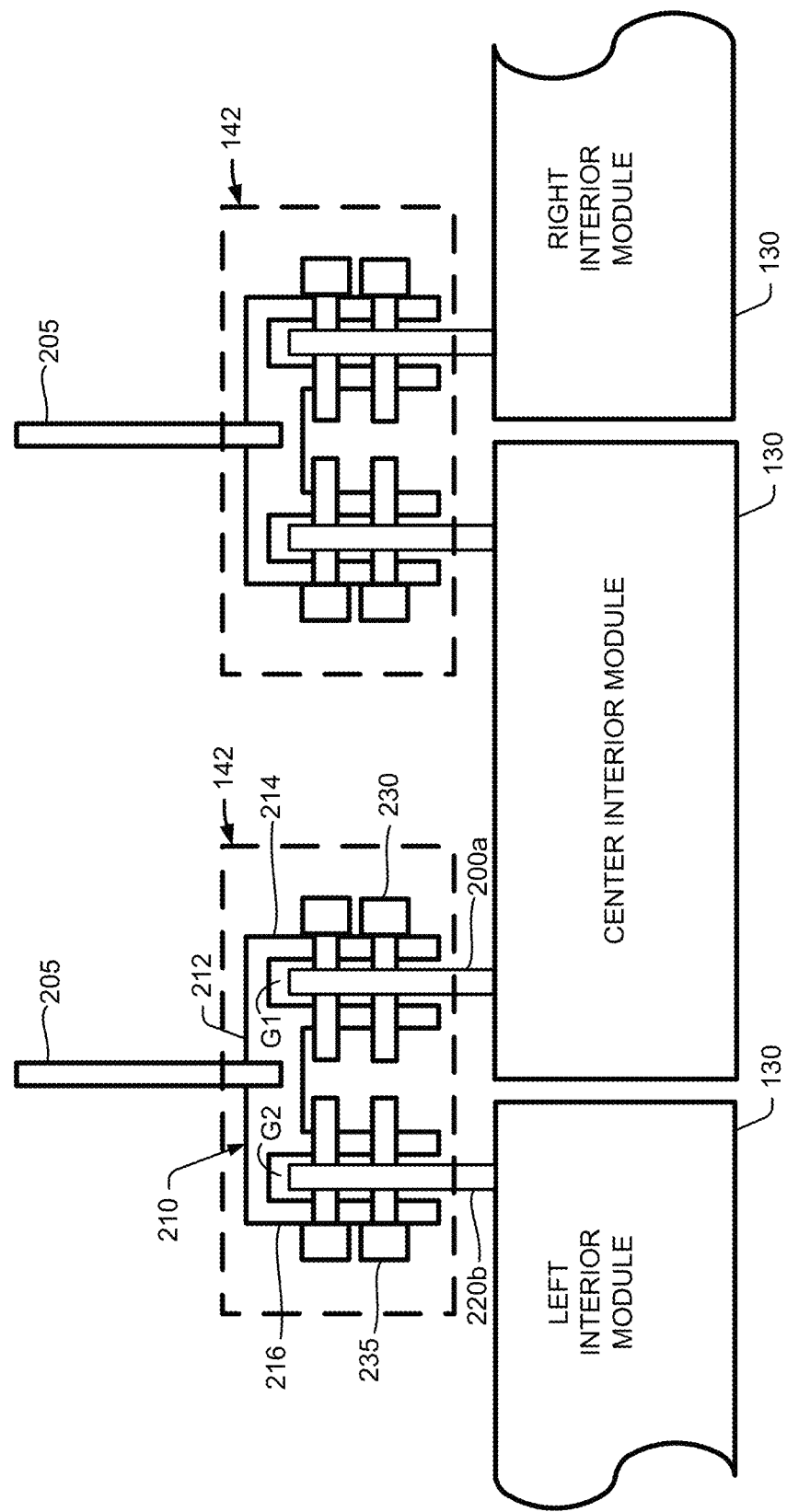
FIG. 2 is an illustration of shared fittings of the support system.

Reference is now made to FIG. 2, which illustrates an example of the first and second shared fittings 142. Each shared fitting 142 is connected to first and second support arms 200a and 200b of adjacent modules 130.

Each shared fitting 142 includes a frame 210 having a central portion 212 configured to be connected to a support structure 120. The central portion 212 may be connected directly to a support structure 120, or it may be connected indirectly to a support structure 120. For instance, the central portion 212 may be connected indirectly to the support structure 120 via a connecting member 146 such as a tie rod 205.

The frame 210 further has first and second clevises 214 and 216 at opposite ends of the central portion 212. The central portion 212 and the first and second clevises 214 and 216 may be unitary. The first clevis 214 forms a first gap G1, and the second clevis 216 forms a second gap G2. The first support arm 200a extends into the first gap G1, and the second support arm 200b extends into the second gap G2. The first support arm 200a is releasably pinned to the first clevis 214, and the second support arm 200b is releasably pinned to the second clevis 216.

Each support arm 200a and 200b may be pinned to the frame 210 by a pair of releasable pins. As illustrated in FIG. 2, the first support arm 200a is pinned to the first clevis 214 by a first pair of pins 230. Each pin 230 of the first pair extends through aligned holes in the first clevis 214 and the first support arm 200a.

Similarly, the second support arm 200b is pinned to the second clevis 216 by a second pair of pins 235. Each pin 235 of the second pair extends through aligned holes in the second clevis 216 and the second support arm 200b.

To remove the center interior module 130, the pins 230 of the first shared fitting 142 are removed, and the pins 235 of the second shared fitting 142 are removed. The center interior module 130 may be lowered away. While the center interior module 130 is removed, the shared fittings 142 react rotational forces from the left and right interior modules 130.

Figure 3:
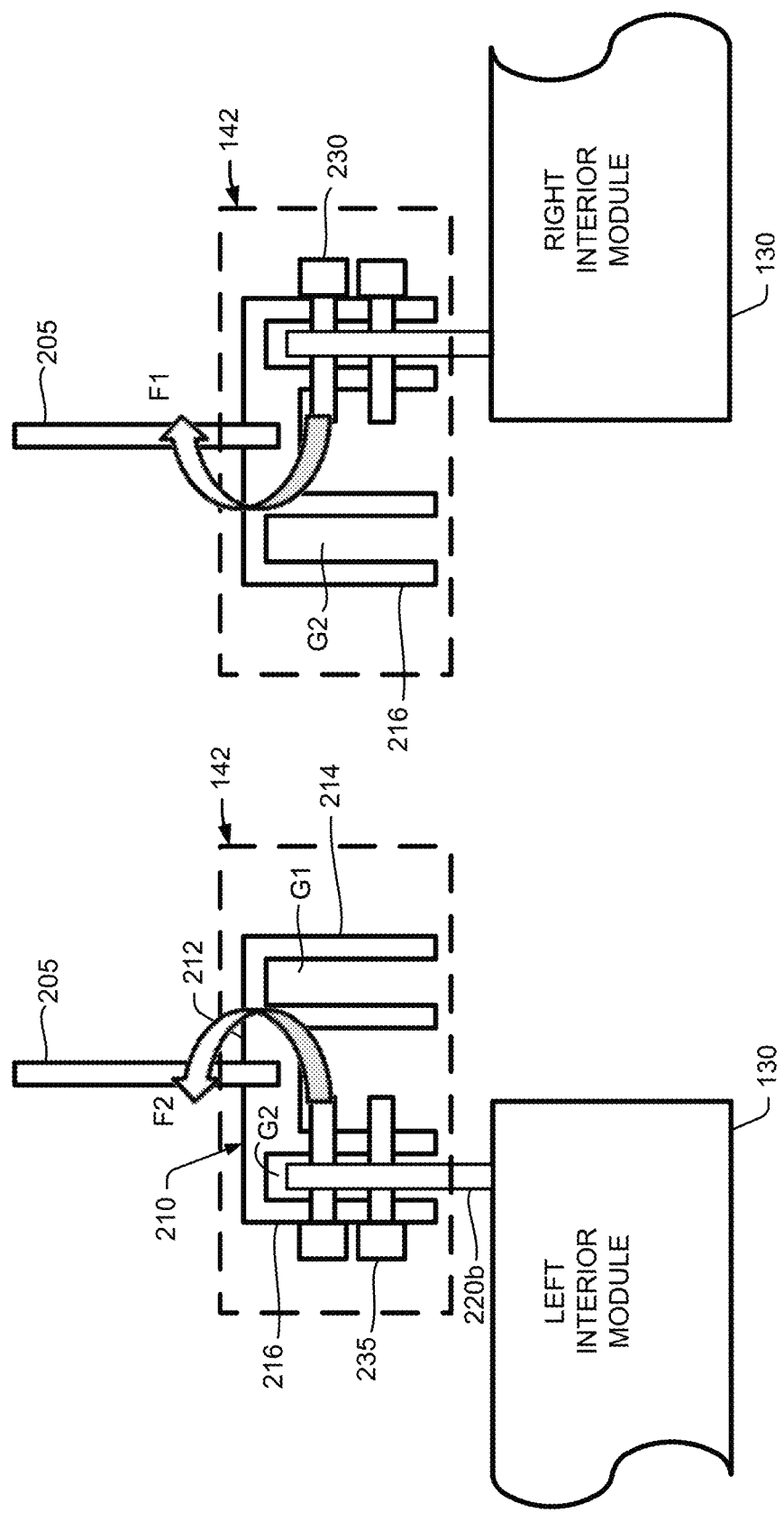
FIG. 3 is an illustration rotational forces on the shared fittings when a central interior module is removed.

As illustrated in FIG. 3, the central portion 212 and the first clevis 214 are configured to react a first rotational force (F1) when the two pins 235 for the second clevis 216 are released and removed. The central portion 212 and the second clevis 216 are configured to react a second rotational force (F2) when the two pins 230 for the first clevis 214 are released and removed.

Consequently, there is no need to support the left and right interior modules 130 with lift tools or other support devices. This reduces factory flow and touch time.

Had the shared fittings been of a conventional design, the left and right interior modules 130 would tend to rotate during removal of the center interior module. As a result, additional support of the left and right interior modules 130 would be required. Had each interior module 130 been supported by two separate fittings, rotational forces wouldn't be an issue during removal of the center interior module 130. However, the separate fittings would result in higher weight, more structural interfaces requiring moisture protection, and more interfaces to manage.

Only a single pin 230, 235 through each support arm 200a and 200b is needed to support loads in service. As a result, one of the two pins 230 in the first pair and one of the two pins 235 in the second pair may be removed to reduce the "fly-away weight." At the time of module removal and installation, however, all pins 230 and 235 are installed.

The first and second gaps G1 and G2 may dimensioned to allow the support arms 200a and 200b (and the modules 130) to move relative to the shared fitting 142. Some configurations may require slip in station at either gap G1 or G2, thus requiring a larger gap G1 or G2.

A support system herein is not limited to the configuration of FIG. 2. For instance, in other configurations, the interior modules 130 may be modified to have devices instead of supporting arms, and the shared fittings may have tangs that fit in the gaps within the clevises. The tangs may be held in place by releasable pins.

Figure 4:
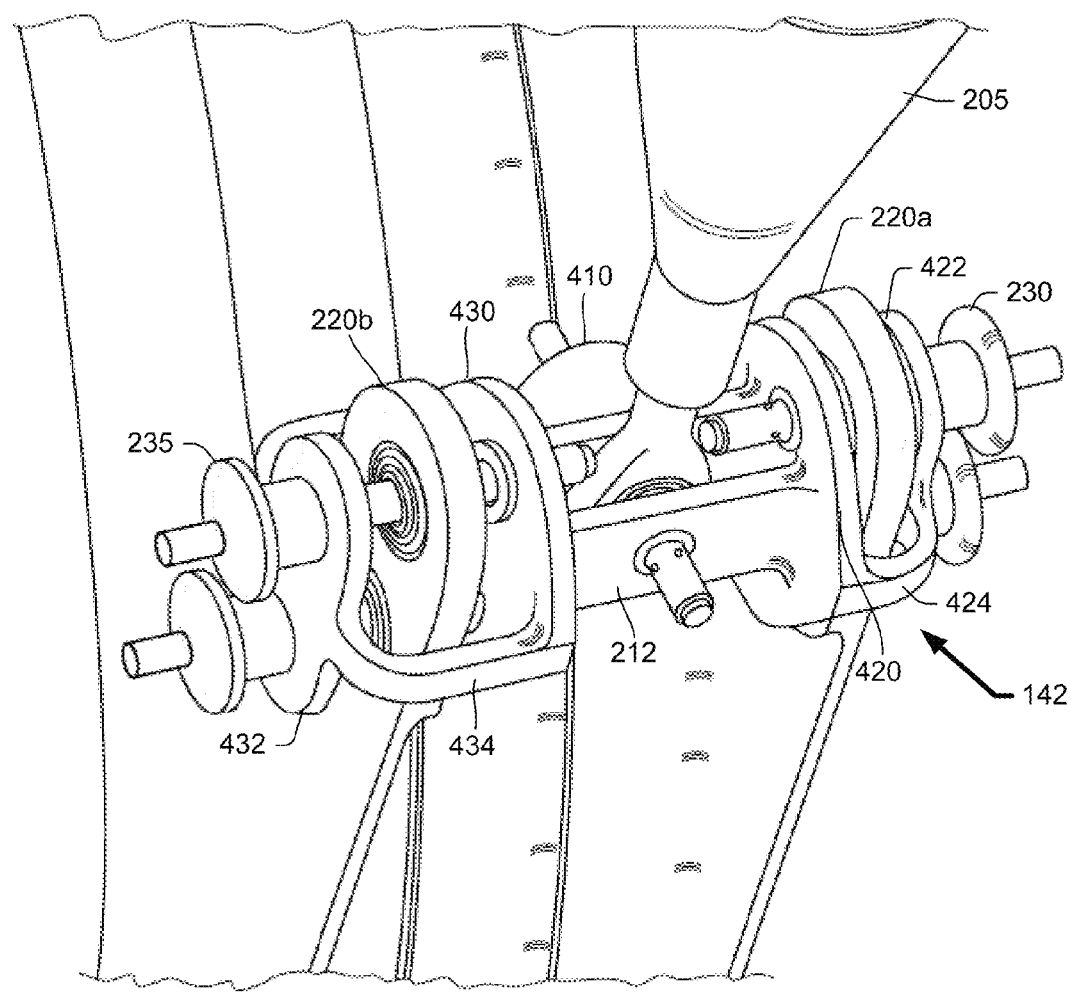
FIG. 4 is an illustration of a shared fitting for the support system.

Reference is now made to FIG. 4, which illustrates another example of a shared fitting 142. In the shared fitting 142 of FIG. 4, the central portion 212 forms a gap for accepting an end of a tie rod 205. A releasable pin 410 extends through aligned opening in the central portion 212 and the tie rod 205.

The first clevis 214 includes a first plate 420 at a first end of the central portion 212, a second plate 422 spaced apart from the first plate 420 to form the first gap, and at least one cross member 424 for rigidly connecting the second plate 422 to the first plate 420. The second clevis 216 includes a third plate 430 at a second end of the central portion 212, a fourth plate 432 spaced apart from the third plate 430 to form the second gap, and at least one cross member 434 for rigidly connecting the fourth plate 432 to the third plate 430. The central portion 212, the four plates 420, 422, 430 and 432 and the cross members 424 and 434 may be unitary.

The first support arm 220a extends into the gap between the first and second plates 420 and 422. Releasable pins 230 are inserted through aligned openings in the first support arm 200a and the first and second plates 420 and 422. Similarly, the second support arm 200b extends into a gap between the third and fourth plates 430 and 432. Releasable pins 235 are inserted through aligned openings in the second support arm 200b and the third and fourth plates 430 and 432.

The releasable pins 230, 235 and 410 may be quick release ball lock pins. A quick release ball lock pin will not release until a button on its handle is depressed, which then allows balls to retract into a shank.

The invention claimed is:

1. An aircraft fuselage comprising:
   a support structure;
   a first interior module having a first support arm;
   a second interior module having a second support arm; and
   a support system for suspending the first and second interior modules adjacent to each other from the support structure, the support system including a frame having a central portion that is connected to the support structure, and a shared fitting releasably attached to the first and second support arms of the first and second interior modules, respectively, the shared fitting configured to react a first rotational force when the first support arm is attached and the second support arm is released, the shared fitting configured to react a second rotational force when the second support arm is attached and the first support arm is released.

2. The aircraft fuselage of claim 1, wherein the support structure includes at least one of an airframe, floor beam, or secondary support structure.

3. The aircraft fuselage of claim 1, wherein the first and second interior modules include at least one of an overhead bin, a ladder, and a monument.

4. The aircraft fuselage of claim 1, wherein the shared fitting includes:

first and second devises at opposite ends of the central portion;
the first support arm extending into a first gap formed by the first clevis, the second arm extending into a second gap formed by the second clevis;
the first support arm releasably pinned to the first clevis;
the second support arm releasably pinned to the second clevis.

5. The aircraft fuselage of claim 4, wherein the shared fitting further includes a first pair of releasable pins for pinning the first support arm to the first clevis, and a second pair of releasable pins for pinning the second support arm to the second clevis.

6. The aircraft fuselage of claim 5, wherein the central portion and the first clevis are configured to react rotational forces when only the second pair of releasable pins are released and removed; and wherein the central portion and the second clevis are configured to react rotational forces when only the first pair of releasable pins are released and removed.

7. The aircraft fuselage of claim 4, wherein the support system further includes a tie rod having a first end secured to the support structure and a second end releasably pinned to the central portion of the frame.

8. A support system for suspending first and second interior modules from a support structure in an aircraft fuselage, the first and second interior modules having first and second support arms, respectively, the support system comprising a shared fitting, the shared fitting including:
a frame having a central portion configured for coupling to the support structure, and first and second devises at opposite ends of the central portion, the first clevis forming a first gap, the first gap configured to receive the first support arm, the second clevis forming a second gap, the second gap configured to receive the second support arm;
a first pair of releasable pins configured to pin the first support arm to the first clevis; and
a second pair of releasable pins configured to pin the second support arm to the second clevis.

9. The support system of claim 8, wherein the central portion and the first clevis are configured to react rotational forces when the second pair of pins are released and removed; and wherein the central portion and the second clevis are configured to react rotational forces when the first pair of pins are released and removed.

10. The support system of claim 8, further comprising a tie rod having a first end securable to the support structure and a second end releasably pinned to the central portion of the frame.

11. The support system of claim 8, wherein the central portion and the first and second devises are unitary.

12. The support system of claim 8, wherein the first clevis includes a first plate at a first end of the central portion, a second plate spaced apart from the first plate to form the first gap, and at least one cross member connecting the second plate to the first plate; and wherein the second clevis includes a third plate at a second end of the central portion, a fourth plate spaced apart from the third plate to form the second gap, and at least one cross member connecting the fourth plate to the third plate.

13. A shared fitting for connecting adjacent first and second support arms of first and second interior modules, respectively, to an aircraft support structure, the shared fitting comprising:
a central portion configured for securing to the support structure;
a first plate at a first end of the central portion;
a second plate spaced apart from the first plate to form a first gap that is dimensioned to receive the first support arm;
a first pair of releasable pins configured to pin the first support arm to the first and second plates;
a third plate at a second end of the central portion;
a fourth plate spaced apart from the third plate to form a second gap that is dimensioned to receive the second support arm; and
a second pair of releasable pins configured to pin the second support arm to the third and fourth plates.

14. The shared fitting of claim 13, wherein the central portion forms a gap for receiving an end of a tie rod; and wherein the shared fitting further comprises a releasable pin extending through the central portion of the frame and across the gap.

15. The shared fitting of claim 13, wherein the plates and the central portion are unitary.

\* \* \* \* \*

UNITED STATES PATENT AND TRADEMARK OFFICE
CERTIFICATE OF CORRECTION

PATENT NO. : 9,919,799 B2
APPLICATION NO. : 14/547314
DATED : March 20, 2018
INVENTOR(S) : Brett N. Altmyer et al.

Page 1 of 1

It is certified that error appears in the above-identified patent and that said Letters Patent is hereby corrected as shown below:

In the Claims

Column 5, Line 1, delete the word "devises" and substitute therefore --clevises--.
Column 5, Line 31, delete the word "devises" and substitute therefore --clevises--.
Column 6, Line 8, delete the word "devises" and substitute therefore --clevises--.

Signed and Sealed this
Eighth Day of May, 2018

Andrei Iancu
*Director of the United States Patent and Trademark Office*